(12) United States Patent
Reinert

(10) Patent No.: US 8,383,282 B2
(45) Date of Patent: Feb. 26, 2013

(54) CONTACT ARRANGEMENT AND METHOD FOR ASSEMBLING A FUEL CELL STACK FROM AT LEAST ONE CONTACT ARRANGEMENT

(75) Inventor: Andreas Reinert, Dresden (DE)

(73) Assignee: Staxera GmbH, Dresden (DE)

( * ) Notice: Subject to any disclaimer, the term of this patent is extended or adjusted under 35 U.S.C. 154(b) by 475 days.

(21) Appl. No.: 12/531,598
(22) PCT Filed: Jan. 11, 2008
(86) PCT No.: PCT/DE2008/000048
§ 371 (c)(1),
(2), (4) Date: Sep. 16, 2009
(87) PCT Pub. No.: WO2008/119310
PCT Pub. Date: Oct. 9, 2008

(65) Prior Publication Data
US 2010/0104914 A1    Apr. 29, 2010

(30) Foreign Application Priority Data

Apr. 2, 2007  (DE) .......................... 10 2007 015 712
Apr. 10, 2007 (DE) .......................... 10 2007 016 905
Nov. 26, 2007 (DE) .......................... 10 2007 056 752

(51) Int. Cl.
H01M 8/24 (2006.01)
(52) U.S. Cl. ........................................ 429/452; 429/457
(58) Field of Classification Search .................. 429/452, 429/456, 457, 468, 467, 471, 479, 482, 483
See application file for complete search history.

(56) References Cited

U.S. PATENT DOCUMENTS 6,656,625 B1 * 12/2003 Thompson et al. ........... 429/465
2003/0224238 A1 * 12/2003 Finn et al. ....................... 429/35
2004/0043278 A1   3/2004 Bourgeois et al.
2005/0221163 A1 * 10/2005 Yang et al. ...................... 429/44

FOREIGN PATENT DOCUMENTS

DE       699 15 056 T2     9/2004
WO     WO 2006/024246 A   3/2006

OTHER PUBLICATIONS

International search Report dated Nov. 26, 2008.

* cited by examiner

*Primary Examiner* — Carlos Barcena
(74) *Attorney, Agent, or Firm* — Fitch, Even, Tabin & Flannery, LLP

(57) ABSTRACT

The invention relates to a contact arrangement for a fuel cell stack, especially for an SOFC fuel cell stack, comprising an interconnector arrangement which is arranged to establish an electrically conducting connection via at least one contact element on the anode side and at least one such element on the cathode side between an anode of a first membrane electrode assembly and a cathode of a second membrane electrode assembly. The invention is characterized in that at least one component to be sintered is provided on only one side of the interconnector arrangement, on the side of the interconnector arrangement facing the anode or the one facing the cathode, the component being coupled to the first or second membrane electrode assembly in such a manner that the electrically conducting connection can be established via the contact element on the anode side or via that on the cathode side by sintering the component to be sintered. The invention also relates to a method for assembling a fuel cell stack form at least one such contact arrangement. The invention further relates to a fuel cell stack, especially an SOFC fuel cell stack, comprising said contact arrangement, the fuel cell stack preferably being assembled according to the aforementioned method.

15 Claims, 3 Drawing Sheets

Figure 1:
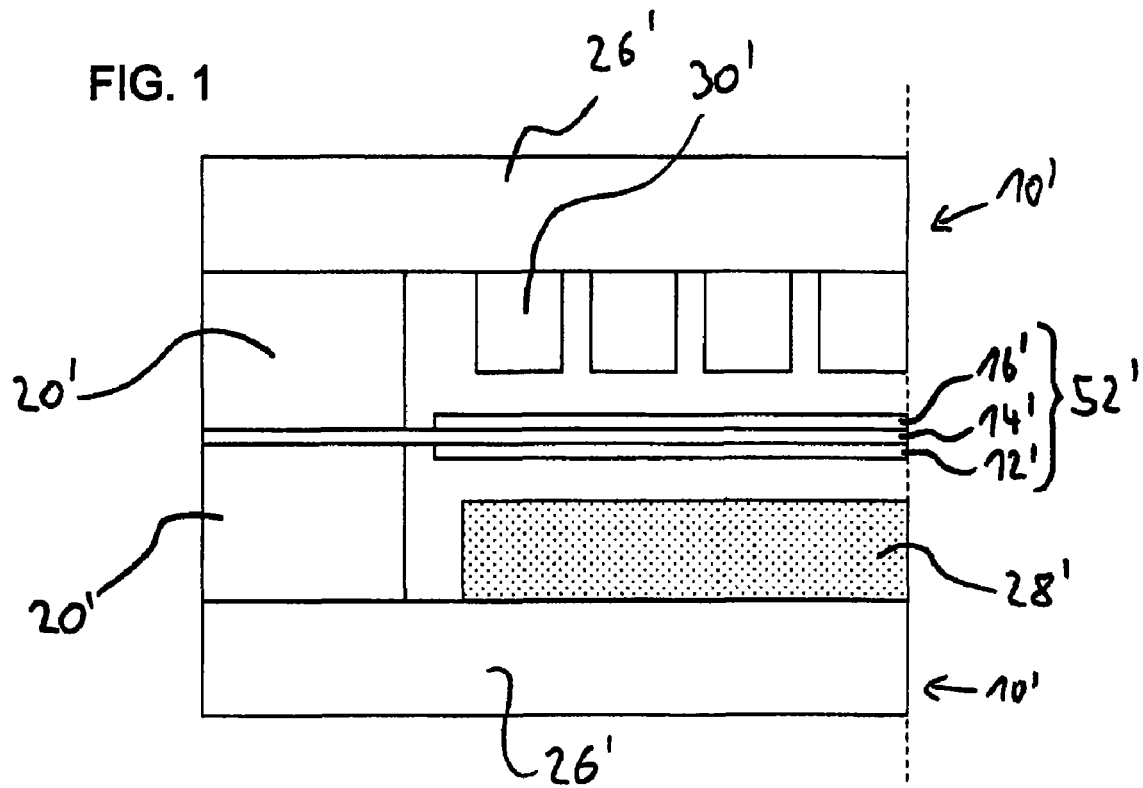

CONTACT ARRANGEMENT AND METHOD FOR ASSEMBLING A FUEL CELL STACK FROM AT LEAST ONE CONTACT ARRANGEMENT

CROSS-REFERENCE TO RELATED APPLICATIONS

This Application is a U.S. national phase application filed under 35 U.S.C. §371 of International Application No. PCT/DE2008/000048, filed Jan. 11, 2008, designating the United States, which claims priority from German Patent Application Nos.: DE 10 2007 015 712.8, filed Apr. 2, 2007; DE 10 2007 016 905.3, filed Apr. 10, 2007 and DE 10 2007 056 752.0, filed Nov. 26, 2007, which are hereby incorporated herein by reference in their entirety for all purposes.

The invention refers to a contact arrangement for a fuel cell stack, in particular for an SOFC fuel cell stack, with an interconnector arrangement which is arranged to establish an electrically conducting connection between an anode of a first membrane electrode assembly and a cathode of a second membrane electrode assembly via at least one contact element arranged on an anode side and at least one contact element arranged on a cathode side.

In addition, the invention refers to a method for assembling a fuel cell stack, in particular an SOFC fuel cell stack, from at least one contact arrangement comprising an interconnector arrangement which is arranged to establish an electrically conducting connection between an anode of a first membrane electrode assembly and a cathode of a second membrane electrode assembly via at least one contact element arranged on an anode side and at least one contact element arranged on a cathode side.

Furthermore, the invention refers to a fuel cell stack, in particular an SOFC fuel cell stack.

Conventionally, several individual fuel cells respectively membrane electrode assemblies are combined into a so-called fuel cell pack or fuel cell stack to achieve a larger electrical power than a single fuel cell can provide on its own. In doing so, adjacent fuel cells of the fuel cell stack are each coupled electrically as well as mechanically via interconnector arrangements connecting them. Due to said coupling of the individual fuel cells via the interconnector arrangements thus there are created fuel cells stapled on top of each other which are electrically coupled in series, which together form the fuel cell stack. Commonly, there are gas distributor structures formed in the interconnector arrangements according to prior art, via which supply gases are guided through respective membrane electrode assemblies.

These gas distributor structures can be for example partly formed by a housing part of the interconnector arrangement. For this purpose, there are usually provided at the housing part of the interconnector arrangement recesses extending like channels respectively bulges or bars which form a channel wall portion of gas channels. The other channel wall portion is then formed in the mounted state of the interconnector arrangement in the fuel cell stack for example partly by a membrane electrode assembly, in particular by an anode or a cathode of an adjacent membrane electrode assembly, so as to create a gas channel below and above the housing part from both channel wall portions. Such gas distributor structures of the fuel cell stack are often also called manifolds. These manifolds are used to effect that the supply gases for each membrane electrode assembly are distributed in corresponding electrode spaces.

Figure 2:
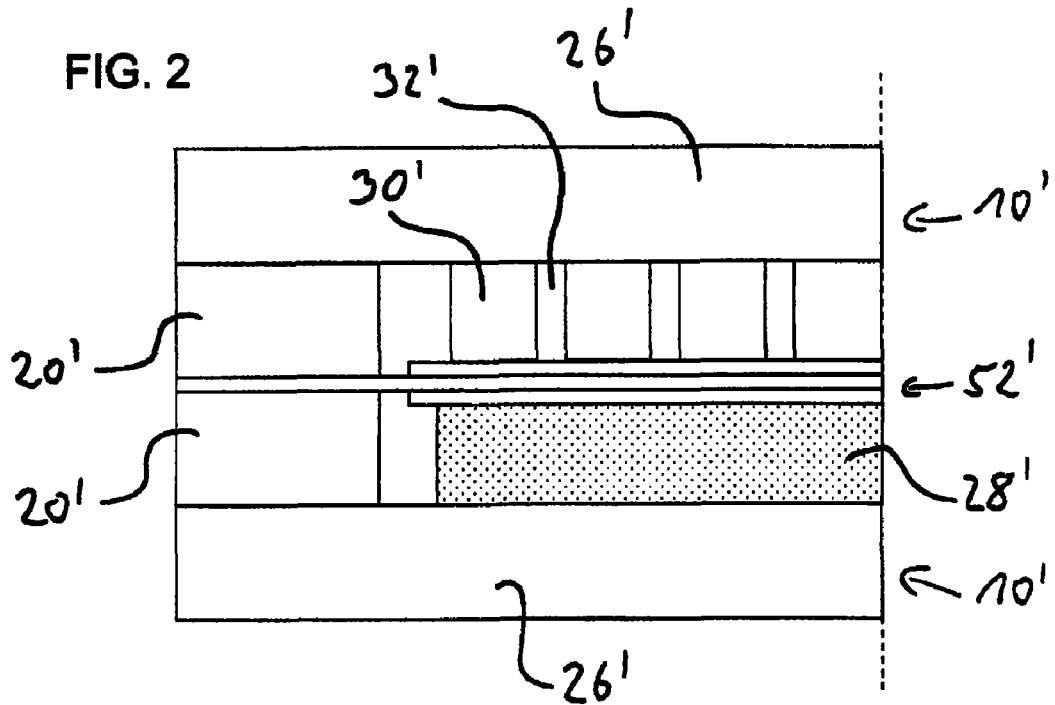

Generally, fuel cell stacks are mainly made from ferritic materials. These ferritic materials show a low mechanical stability at high temperatures, which can make itself known as deformations via flowing or creepage. This occurs in particular when a hollow space is formed by a structure pressed from thin-walled sheet metal as is the case in the above-mentioned gas distributor structures with gas channels. To avoid such deformations, spacers respectively distance pieces are often inserted into the corresponding hollow space, which are provided between the housing parts of an interconnector arrangement and a membrane electrode assembly and hence contribute to the stabilization of the fuel cell stack. Already known embodiments of interconnector arrangements for example are provided with frames extending also around the fuel cell stack at its edge regions, in particular by annular constructions around the manifolds, which are at least partly produced directly from the sheet metal of a housing part of the interconnector assembly. In a fuel cell stack under tension, a force flow is then mainly guided through these regions, i.e., for example through an annular construction in the edge region. Such guiding of a force flow respectively force transmission which mainly is going through the frame in the edge region and to a lesser degree through the center region of the manifolds of the fuel cell stack, however, brings several substantial disadvantages. For example, the force flow goes through sealing material also provided in the edge region of the fuel cell stack, which is respectively arranged in grooves between individual fuel cells or membrane electrode assemblies, respectively, and interconnector arrangements, and is mostly formed from glass ceramics. Glass ceramics however tend to creepage or flowing, in particular at higher temperatures, appearing during operation of the fuel cell stack. Therefore the seals at the edge region of the fuel cell stack and the electrical contacting, in particular contact elements, of the fuel cell stack (active area) arranged more interiorly are always in competition with the seals arranged at the edge via the interconnector arrangement. In particular when assembling the fuel cell stack, disadvantages can occur due to use of glass ceramics seals, which will be explained more detailed referring to FIGS. 1 and 2. FIG. 1 shows a schematic view of a section of a prior art fuel cell stack prior to performing an assembling process, in particular prior to a sintering process. FIG. 2 on the other hand shows a schematic view of a section of the fuel cell stack of FIG. 1 after an assembling process has been performed, in particular after the sintering process.

Generally, sintering respectively a sinter process is a master forming production method. During sintering usually in particular powder masses are first formed in such a way that at least a minimal cohesion of the powder particles respectively powder grains is given. The pre-pressed so called "green body" (German: "Grünling") subsequently is compressed using heat treatment below the melting temperature and is hardened. The manufacturing of the "green body" can be performed by pressing of powder masses or by forming and subsequent drying. The sinter process usually proceeds in three phases, during which porosity and volume of the "green body" substantially decrease. In the first phase there merely occurs a compression of the "green body", whereas in the second phase the open porosity significantly decreases. The solidity of the sinter bodies is based on the sinternecks formed in the third phase, which arise due to surface diffusion between the powder particles.

In the case of for example assembling glasses respectively glass ceramics to be sintered, however, pressed pre-forms respectively pre-pressed "green bodies" are not usually used. Preferred in this case are films manufactured using film casting respectively "tape casting" or template printable or dispensable pastes. These comprise a binder, hence prior to the sinter process a removal of the binder is performed. After the removal of the binder in particular in ceramics parts respectively glass ceramics there is obtained a so called "white piece" or "white body". These are very porous and have a minimum solidity. After removal of the binder the "white bodies" are compressed such that the "white bodies" obtain their corresponding solidity after the sintering procedure.

The fuel cell stack partially shown in FIGS. 1 and 2, in particular an SOFC fuel cell stack, comprises a bipolar plate respectively an interconnector arrangement 10', a membrane electrode assembly (MEA) 52', as well as anode and cathode contact elements 28', 30'. In addition, there are provided glass assembling parts to be sintered in the form of glass seal elements 20' at an upper and lower side of the MEA 52', respectively, as shown in FIGS. 1 and 2. Thus, according to prior art it is intended to arrange the glass ceramics seals 20' on both sides of the MEA 52'. Due to the shrinkage of the glass ceramics seals 20' to be considered during sintering, in the "white" state there are intermediate spaces in between the electrodes (anode 12' or cathode 16') of the MEA 52' and the contact elements 28', 30', i.e., in the state shown in FIG. 1 there is not yet established an electrically conducting connection via the corresponding interconnector arrangements, as contact elements 28' and 30' are not yet in contact with the corresponding electrodes 12', 16' of the MEA 52'. Only after the assembling respectively after the sintering procedure has been performed, the electrically conducting connections are established via the corresponding contact elements 28', 30' of the respective interconnector arrangement 10', in particular due to a shrinkage of the glass ceramics seals 20' due to sintering as well as viscous flowing. This occurs under permanent mechanical load on the fuel cell stack respectively under tensioning of the fuel cell stack, as otherwise a lateral shrinkage of the glass ceramics seals 20' can occur, which can cause leakages. The manufacturing of the electrically conducting connection via the corresponding interconnector arrangement 10' can only occur after the deposition of the glass ceramics seals 20' due to sintering and viscous flowing at high temperatures. The assembling temperatures however are too low to achieve a sintering of the contact elements 28', 30'. Thus, the electrical connection of the interconnecting arrangement 10' with the MEA 52' is usually only achieved via force closure. In this, only a limited adaptation of the contact surfaces of the contact elements 28', 30' of the interconnector arrangement 10' occurs. Hence, neither form closure nor an adhesive bound between the contact elements 28', 30' and the MEA 52' are present. In addition, the construction of the fuel cell stack 52' partially shown in FIGS. 1 and 2 is extremely elaborate, as there is provided a glass frame formed by the glass ceramics seals 20' on both sides of the MEA 52' to ensure the soundness of the sealing for the gas distributor structures inside the interconnector arrangement. Moreover, due to the construction disparate mechanical resistances at the glass ceramics seals 20' and the contact surfaces respectively contact elements 28', 30' on both sides of the MEA 52' lead to bending moments in the MEA 52'. These can lead to a breakage of the MEA 52', which is usually very fragile. This is for example the case if the nickel foam 28', which is formed as anode contact element, is formed to be softer than the glass ceramics seals 20' and the cathode contact element 30' respectively contact bars 30' opposing the nickel foam 28'. The contact bars 30' push themselves at the edge of the MEA 52' into the nickel foam 28'. This can lead to breakage of the MEA 52'.

Hence it is an object of the invention to improve generic contact arrangements and methods for assembling fuel cell stacks such that the above-mentioned disadvantages can be overcome at least partially and in particular to lower the risk of breakage of membrane electrode assemblies in fuel cell stacks.

This object is achieved by the features of the independent claim.

Advantageous embodiments and developments of the invention ensue from the dependent claims.

The inventive contact arrangement adds to the generic prior art in that there is arranged on one side of the interconnector arrangement only, the side of the interconnector arrangement facing the anode or the cathode, at least one component to be sintered, which is coupled with the first or the second membrane electrode assembly in such a way that the electrically conducting connection via the contact element on the anode side or the cathode side can be established using sintering of the component to be sintered. Thus, the construction of the fuel cell stack is significantly simplified, as for example only one glass ceramics seal respectively only one glass ceramics seal frame is provided as a component to be sintered on one electrode side of the MEA respectively the interconnector arrangement, in particular the anode side for sealing the anode space, and is sintered such that the corresponding contact element establishes the electrically conducting connection between the MEA and the interconnector arrangement due to shrinkage and viscous flowing of the glass ceramics seal. The sinter process thus provides the basis for contact forming of the corresponding contact element, in particular of the anode contact element with the anode of the corresponding MEA, due to the settling during the shrinkage process and the viscous flowing. For example form closure is achieved, if for example a nickel foam as anode contact element is soft and malleable. Moreover, with suitable materials of for example the anode contact element and the anode an adhesive bond can also be achieved; for example an adhesive bond can be achieved in the case of the nickel foam as anode contact element and a nickel anode of the corresponding MEA, which bond due to a diffusion process. In this construction of the fuel cell stack the electrically conducting connection on the cathode side is preferably established already at room temperature via a corresponding cathode contact element, the interconnector arrangement being coupled to the corresponding MEA exclusively via this cathode side contact element, which provides the electrically conducting connection next to the mechanical coupling. In the case of a plurality of such cathode side contact elements, a homogeneous mechanical pressing of the MEA over the complete surface of the MEA, in particular the cathode side, is made possible. The interconnector arrangement in particular is exclusively coupled to the cathode of the MEA in the active region of the fuel cell stack via the cathode side contact elements, i.e., at least in the region in which the electrical contacting of interconnector arrangement and MEA is established. Preferably, interconnector arrangements respectively bipolar plates can be used for such a construction of the fuel cell stack which are constructed in the form of a metal sheet cassette design or are formed in the so-called one-plate-design, which is achieved using manufacture close to a final contour respectively near-net shape. The above-mentioned assembling parts are in particular so called interior assemblies or MEA assemblies respectively joinings. As a matter of course, in a fuel cell stack there are provided other or further assembling locations, for example manifold seals, whose design and construction has to be adjusted to the MEA assembling. The inventive contact arrangement provides a fuel cell stack construction in which the cathode contact elements due to the instantaneous contact with the cathode side of the MEA, which already exists at room temperature, can be formed at room temperature and in an ideal case can bind to the cathode with form closure and/or adhesive bond during the sinter process of the glass ceramics seal. The use of solvent or moist pastes additionally can improve or support this effect. The fuel cell stack construction in particular is thereby substantially simplified, as only one frame-like glass assembling respectively glass ceramics seal is formed on the anode side. Thus assembled fuel cell stacks therefore show a high level of mechanical load capacity, wherein breakage of MEA can be avoided as far as possible.

The inventive contact arrangement can be further developed advantageously in that the component to be sintered is only arranged on the side of the interconnector arrangement facing the anode. As already explained above, there is preferably a glass ceramics seal arranged between the anode of the corresponding MEA and the interconnector arrangement, in particular a bipolar plate part of the interconnector arrangement, and sintered as component to be sintered.

Moreover, the inventive contact arrangement can be constructed such that the interconnector arrangement is coupled to the second membrane electrode assembly on its side facing the cathode exclusively via contact elements. Therein, the coupling of the corresponding contact elements with the cathode of the corresponding MEA can be already performed at room temperature and in the ideal case binds to the cathode of the corresponding MEA during the sintering procedure with form closure and/or adhesive bond. Due to the fact that glass ceramics seals to be sintered are provided on one side of the interconnector arrangement (anode side) only, whereas on the other side of the interconnector arrangement (cathode side) there already exists a mechanical coupling of the contact elements arranged on the cathode side (cathode contact elements) to the corresponding MEA, thus a form closure and/or adhesive bond at least of the cathode contact elements can be achieved.

Furthermore, the inventive contact arrangement can be realized such that the component to be sintered is formed by a glass ceramics seal. In particular, the glass ceramics seal is formed as a frame-like glass ceramics seal extending essentially along the circumference of the MEA, in particular of the electrolyte of the MEA.

Furthermore, the inventive contact arrangement can be designed such that there is provided on the side of the interconnector arrangement facing the anode at least one contact element formed as nickel foam for establishing the electrically conducting connection with the first membrane element assembly.

Moreover, the inventive contact arrangement can be realized such that a plurality of electrically conducting contact elements of the interconnector arrangement facing the cathode is provided, the plurality of electrically conducting contact elements provided at the cathode side being arranged regularly over a total area of the cathode of the second membrane electrode assembly for coupling with the second membrane electrode assembly. In this case, the cathode preferably is formed with an extremely large area; in particular, the cathode of the MEA is formed such that in regards to area it is larger than the anode. It is particularly preferred in this context to form the cathode to be almost as large as the electrolyte of the MEA. Furthermore, the cathode contact elements respectively the cathode contact bars are arranged over the total area of the MEA, preferably in regular intervals to each other, said area almost corresponding to the cathode area or the area of the electrolyte (as seen in the stacking direction of the fuel cells). In particular, a cathode flow field can be formed by the cathode and the cathode contact bars as well as a housing part of the interconnector arrangement. The cathode contact bars can be formed as separate parts as well as being structurally integrated into the housing part of the interconnector arrangement; however, combinations of both are possible. There are also embodiments conceivable in which the cathode flow field is at least partly formed by bars directly from the housing part of the interconnector arrangement, which are brought into contact with the corresponding MEA via certain electrically conducting thin layers. Such layers can be coated onto the corresponding bars, for example using coating techniques as rollcoating or spraycoating. The anode flow field on the other hand can for example be formed by a foam structure, preferably from nickel. The anode flow field can also be structurally integrated into the interconnector arrangement. In this case likewise a combination is possible.

Preferably the inventive interconnector arrangement is developed further in that an area of the cathode of the respective membrane electrode assembly essentially corresponds to the area of an electrolyte of the respective membrane electrode assembly.

In this context, it can be envisaged to form the inventive contact arrangement such that an area of the cathode and/or the electrolyte of the respective membrane electrode assembly is larger than an area of the anode of the respective membrane electrode assembly.

The inventive method adds to the generic prior art by providing at least one component to be sintered on one side of the interconnector arrangement only, the side of the interconnector arrangement facing the anode or the cathode, and coupling it with the first or second membrane electrode assembly such that the electrically conducting connection via the contact element on the anode side or cathode side is established by sintering the component to be sintered. Thereby, the advantages explained in the context of the inventive contact arrangement are achieved in the same or a similar way, for which reason it is referred to the corresponding explanation in the context of the inventive contact arrangement to avoid repetition.

The same is analogously valid for the following preferred embodiments of the inventive method, for which reason in this respect it is also referred to the corresponding explanations in the context of the inventive contact arrangement to avoid repetition.

The inventive method can be developed further in an advantageous way by arranging the component to be sintered only on the side of the interconnector arrangement facing the anode.

Furthermore, the inventive method can be realized with coupling the interconnector arrangement on its side facing the cathode to the second membrane electrode assembly exclusively via contact elements.

In addition, the inventive method can be designed with manufacturing the electrically conducting connection by sintering a glass ceramics seal as component to be sintered.

Moreover, the inventive method can be realized by arranging at least one contact element formed as nickel foam on the side of the interconnector arrangement facing the anode for establishing the electrically conducting connection with the first membrane electrode assembly.

Preferably, the inventive method is designed with arranging a plurality of electrically conducting contact elements of the interconnector arrangement facing the cathode, the plurality of electrically conducting contact elements being provided on the side of the cathode being arranged regularly over a total area of the cathode of the second membrane electrode assembly for coupling with the second membrane electrode assembly.

The inventive method further can be improved by forming an area of the cathode of the respective membrane electrode assembly such that it essentially corresponds to the area of an electrolyte of the respective membrane electrode assembly.

In this context, the inventive method is preferably implemented by forming an area of the cathode and/or the electrolyte of the respective membrane electrode assembly such that it is larger than an area of the anode of the respective membrane electrode assembly.

The inventive fuel cell stack comprises at least one inventive contact arrangement and is preferably assembled according to the inventive method. In this, there are analogously obtained the same advantages as are explained in the context of the inventive contact arrangement.

Figure 3:
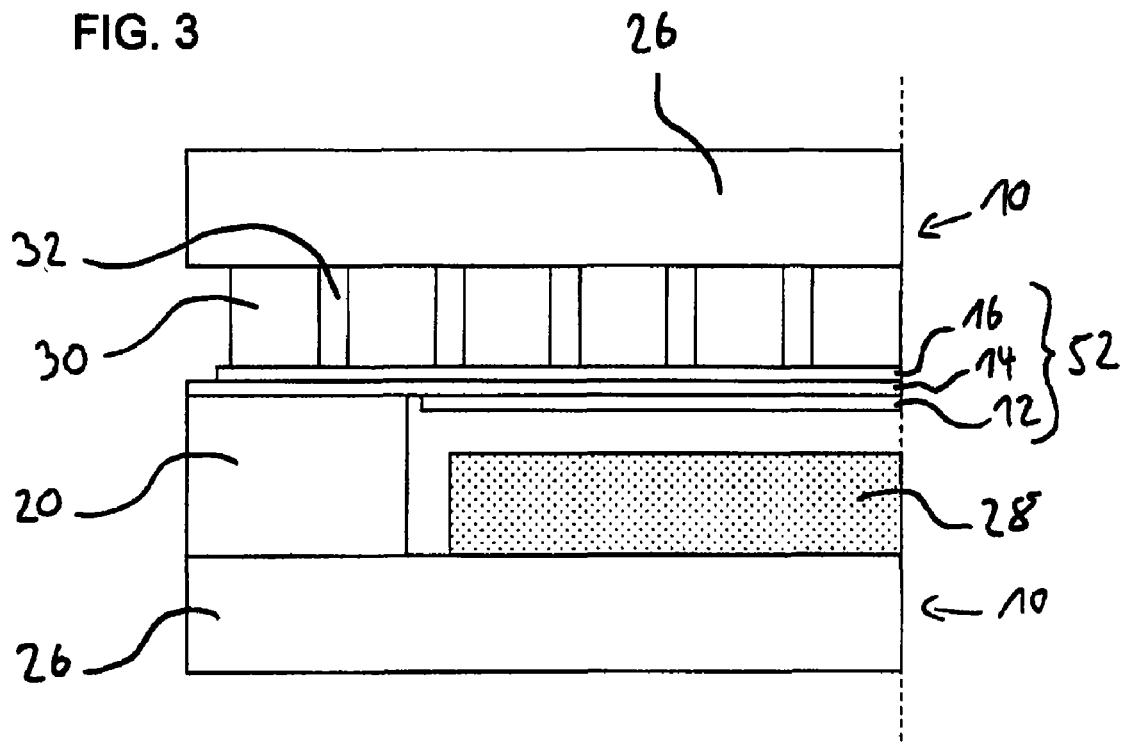
Figure 4:
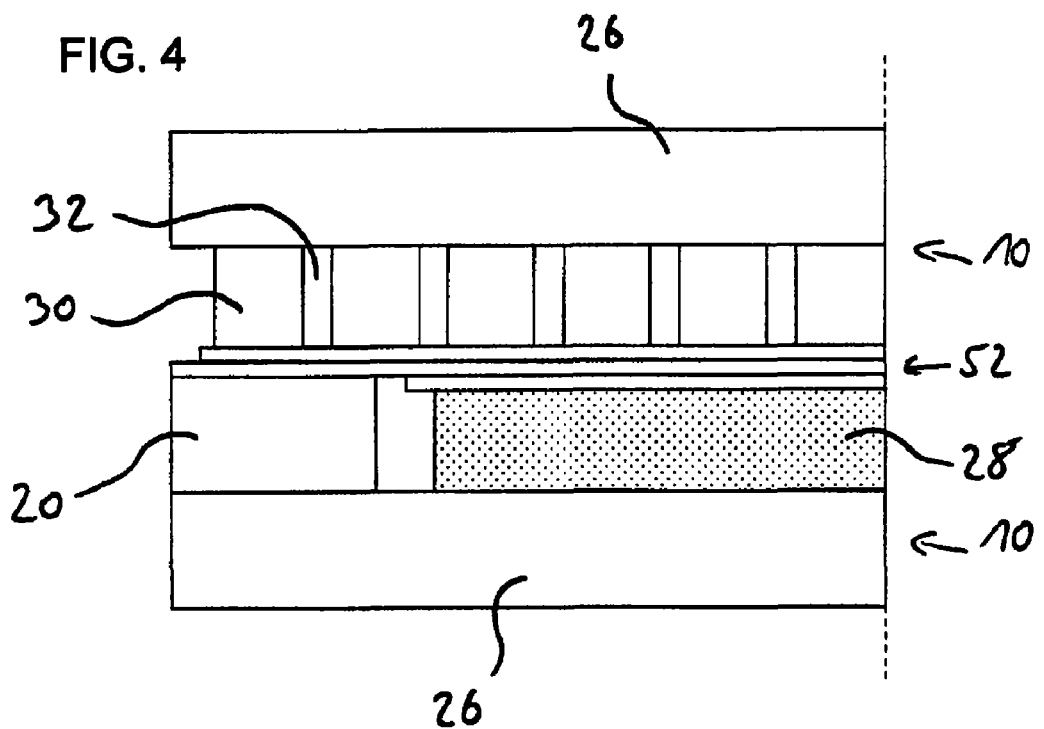
Figure 5:
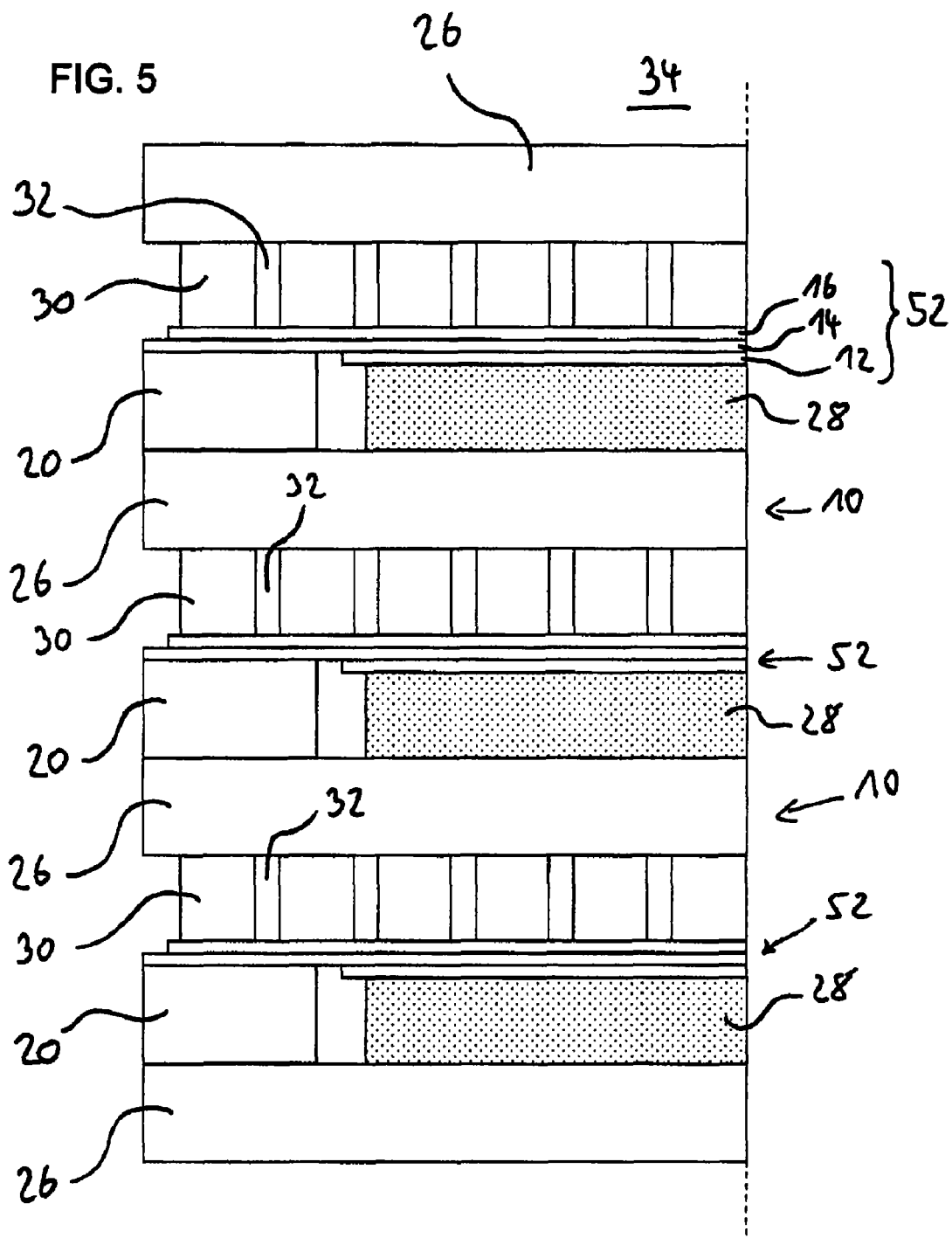

A preferred embodiment of the invention is subsequently exemplary described by means of the figures. These show:

FIG. 1 a schematic view of a section of a fuel cell stack according to prior art prior to performing an assembling method;

FIG. 2 a schematic view of a section of the fuel cell stack of FIG. 1 after performing an assembling method;

FIG. 3 a schematic view of a section of a fuel cell stack prior to performing the inventive assembling method;

FIG. 4 a schematic view of a section of a fuel cell stack after performing the inventive assembling method; and FIG. 5 a schematic view of a section of the fuel cell stack with a plurality of membrane electrode assemblies and interconnector arrangements after performing the inventive assembling method.

FIG. 3 depicts a schematic view of a section of a fuel cell stack 34, in particular of an SOFC fuel cell stack, prior to performing the inventive assembling method. In FIG. 3 there are in particular depicted a membrane electrode assembly (MEA) 52 and two partially shown interconnector arrangements 10 of the fuel cell stack 34, which are arranged above and below the MEA 52. In the fuel cell stack 34 partially shown in FIG. 3 the components of the fuel cell stack to be assembled or joined by sintering, which are explained in more detail in the following, are in the so called "white" state. This means that the components of the fuel cell stack 34 to be assembled by sintering are so called "white bodies".

FIG. 4 on the other hand shows a schematic view of the section of the fuel cell stack 34 of FIG. 3 after performing the inventive assembling method, in particular after sintering the components of the fuel cell stack 34 to be assembled, which are described in more detail in the following.

Firstly, the basic construction of the fuel cell stack 34 in its assembled state is described more closely with reference to FIG. 5 prior to describing performing the inventive method in detail with reference to FIGS. 3 and 4. FIG. 5 shows a schematic view of a section of the fuel cell stack 34 with a plurality of membrane electrode assemblies (MEAs) 52 (in FIG. 5 there are three MEAs shown as an example) and a plurality of interconnector arrangements 10 (in FIG. 5 there are shown two complete interconnector arrangements as an example) after performing the inventive assembling method. The fuel cell stack 34 comprises a plurality of repetitive units, which consist of a membrane electrode assembly 52 and an interconnector arrangement 10, respectively. In FIG. 5 there are in particular shown two complete repetitive units. However, the fuel cell stack 34 can consist of any number of such repetitive units. As can be seen from FIG. 5, the interconnector arrangements 10 are usually arranged between two adjacent membrane electrode assemblies 52, each membrane electrode assembly 52 comprising an anode 12, an electrolyte 14 as well as a cathode 16. In particular, in the context of this description each membrane electrode unit 52 and an interconnector arrangement 10 in contact with the anode 12 of the membrane electrode assembly 52 forms a repetitive unit of the fuel cell stack 34.

As can be seen from FIG. 5 from the completely depicted interconnector arrangements 10, each interconnector arrangement 10 comprises a housing part respectively a bipolar plate part 26, which on its top side as seen in FIG. 5 is directly coupled via a glass ceramics seal 20 to the electrolyte 14 of a membrane electrode assembly 52 arranged above the interconnector arrangement 10. Moreover, the housing part 26 on its lower side is coupled to the cathode 16 of a membrane electrode assembly 52 arranged below this interconnector arrangement 10 exclusively via a plurality of contact bars 30 attached to it. Thereby, any number of contact bars 30 can be used. The housing part 26, the glass ceramics seal 20 and the anode 12 as well as partly the electrolyte 14 form an intermediate space, in which a nickel foam 28 is received, which partially fills out the intermediate space. At the lower side of the housing part 26, that means between the housing part 26 and the lower membrane electrode assembly 52, there are formed respective gas channels 32 by the contact bars 30 provided at the lower side of the housing part 26 and the lower membrane electrode assembly 52. In this case there is preferably guided a gas with high oxygen content or pure oxygen through the gas channels 32, whereas a gas with high hydrogen content or pure hydrogen is guided through the nickel foam 28 and the intermediate space. It can be further seen from FIG. 5 that the anode 12 of each membrane electrode assembly 52 extends perpendicular to the stacking direction of the fuel cells (in FIG. 5 to the left) almost up to the glass ceramics seal 20, which confines the intermediate space at the circumferential region of the fuel cell stack 34. On the other hand, the electrolyte 14 and the cathode 16 radially extend almost up to the outer circumference of the glass ceramics seal 20. Gas inlets respectively manifold potions of the fuel cell stack 34 which lie radially further to the exterior are not shown in this case. Thus, the electrolyte 14 and the cathode 16 essentially have equal (projected) area, as seen in stacking direction of the fuel cells, whereas the area of the anode 12 is substantially lower in comparison to the areas of the electrolyte 14 and the cathode 16.

The inventive method for assembling the fuel cell stack is designed as follows. As can be seen from FIG. 3, the nickel foam 28 arranged in the intermediate space between the housing part 26 of the interconnector arrangement 10 and the anode 12 is in electrically conducting connection and mechanical coupling with the housing part 26 only. This is due to the glass ceramics seal in this section of the fuel cell stack shown in FIG. 3 has a thickness in stacking direction of the fuel cells before performing the sintering which is larger than the thickness of the nickel foam 28 and the anode 12. On the other hand, the contact bars at the top side of the membrane electrode assembly 52 are prior to sintering already in electrically conducting connection with, as well as mechanical coupling to, the cathode 16 of the membrane electrode assembly 52 as well as the housing part 26 of a further interconnector arrangement. As can be seen from FIG. 4, after the sintering, the anode 12 of the membrane electrode assembly 52 and the housing part 26 now are in electrically conducting connection via the nickel foam 28 due to the sintering and viscous flowing of the glass ceramics seal 20 and in addition are mechanically coupled to each other. On the other hand, the direct and exclusive coupling on the cathode side of the membrane electrode assembly 52 to the contact bars 30 of the additional interconnector arrangement 10 on the top remains for maintaining the electrically conducting connection as well as the mechanical coupling without changes. In this, the contact bars 30 arranged on the cathode side of the membrane electrode assembly 52 bond to the cathode of the corresponding membrane electrode assembly 52 with form closure and/or adhesive bond during the sintering procedure of the glass ceramics seal 20.

It is to be noted that the geometry of the fuel cell stack at least partially shown in FIGS. 3 to 5 is rather simplified respectively schematized. For illustrative purposes in FIGS. 3 to 5 for example the glass ceramics seals 20 are shown with a thickness in the stacking direction of the fuel cells which prior to sintering is larger than the thickness of the nickel foam 28 and the anode 12 and after sintering is equal to the thickness of the nickel foam 28 and the anode 12. The thickness of the glass ceramics seals 20, however, is preferably designed rather thin. The height compensation necessary to contact the nickel foam 28 can be provided by corresponding designing other components; for example, the bipolar plate can be realized with thicker edge regions and/or recessed flow field.

The features of the invention disclosed in the preceding specification, in the figures as well as the claims, can be relevant for the implementation of the invention individually or in any combination.

The invention claimed is:

1. A contact arrangement for a fuel cell stack, comprising:
a first and a second membrane electrode assembly, the first and the second membrane electrode assemblies each having and anode and cathode;
an interconnector arrangement for establishing an electrically conducting connection between the anode of the first membrane electrode assembly and the cathode of the second membrane electrode assembly through at least one contact element on an anode side of the interconnector arrangement and at least one contact element on a cathode side of the interconnector arrangement, wherein at the side of the interconnector arrangement facing the anode, at least one component to be sintered is provided which is coupled to the first or second membrane electrode assembly such that the electrically conducting connection can be established through the contact element on the anode side by sintering of the component to be sintered, wherein at the side of the interconnector arrangement facing the cathode, the interconnector is coupled to the second membrane electrode assembly exclusively through at least one contact bar.

2. The contact arrangement of claim 1, wherein the component to be sintered is arranged on the side of the interconnector arrangement facing the anode only.

3. The contact arrangement of claim 1, wherein the component to be sintered is formed by a glass ceramics seal.

4. The contact arrangement of claim 1, wherein at least one contact element formed as nickel foam for establishing the electrically conducting connection with the first membrane electrode assembly is provided on the side of the interconnector arrangement facing the anode.

5. The contact arrangement of claim 1, wherein a plurality of electrically conducting contact elements of the interconnector arrangement facing the cathode is provided, the plurality of electrically conducting contact elements provided on the cathode side being arranged regularly over a total area of the cathode of the second membrane electrode assembly for coupling to the second membrane electrode assembly.

6. The contact arrangement of claim 1, wherein an area of the cathode of the respective membrane electrode assembly essentially corresponds to the area of an electrolyte of the respective membrane electrode assembly.

7. The contact arrangement of claim 1, wherein an area of the cathode and/or the electrolyte of the respective membrane electrode assembly is larger than an area of the anode of the respective membrane electrode assembly.

8. A method for assembling a fuel cell stack from at least one contact arrangement comprising:
providing an interconnector arrangement arranged for establishing an electrically conducting connection between an anode of a first membrane electrode assembly and a cathode of a second membrane electrode assembly through at least one contact element on an anode side and at least one contact element on a cathode side;
providing at least one component to be sintered on the side of the interconnector arrangement facing the anode
coupling the interconnector arrangement on its side facing the cathode to the second membrane electrode assembly exclusively through at least one contact bar;
coupling the component to be sintered to the first or second membrane electrode assembly such that the electrically conducting connection via the contact element on the anode side is established by sintering the component to be sintered.

9. The method of claim 8, further comprising the step of arranging the component to be sintered on the side of the interconnector arrangement facing the anode only.

10. The method of claim 8, further comprising the step of manufacturing the electrically conducting connection by sintering a glass ceramics seal as component to be sintered.

11. The method of claim 8, further comprising the step of arranging at least one contact element formed as nickel foam on the side of the interconnector arrangement facing the anode for establishing the electrically conducting connection with the first membrane electrode assembly.

12. The method of claim 8, further comprising the step of arranging a plurality of electrically conducting contact elements of the interconnector arrangement facing the cathode, the plurality of electrically conducting contact elements provided on the cathode side being arranged regularly over a total area of the cathode of the second membrane electrode assembly for coupling to the second membrane electrode assembly.

13. The method of claim 8, further comprising the step of forming an area of the cathode of the respective membrane electrode assembly such that it essentially corresponds to the area of an electrolyte of the respective membrane electrode assembly.

14. The method of claim 8, further comprising the step of forming an area of the cathode and/or the electrolyte of the respective membrane electrode assembly such that it is larger than an area of the anode of the respective membrane electrode assembly.

15. A cell stack comprising at least one contact arrangement of claim 1 and being assembled according to a method of claim 9.

* * * * *